United States Patent [19]
Hsu et al.

[11] Patent Number: 5,900,260
[45] Date of Patent: * May 4, 1999

[54] ACCUMULATOR HEAD HAVING A SEGMENTED BARREL

[75] Inventors: John S. Hsu; Lynn M. Tore, both of Cincinnati, Ohio

[73] Assignee: Cincinnati Milacron Inc., Cincinnati, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/761,915

[22] Filed: Dec. 9, 1996

[51] Int. Cl.$^6$ .................................................. B29C 49/04
[52] U.S. Cl. .................... 425/532; 425/376.1; 425/382.4
[58] Field of Search .................... 425/130, 532, 425/376.1, 382.4

[56] References Cited

U.S. PATENT DOCUMENTS

| | | | |
|---|---|---|---|
| 3,909,183 | 9/1975 | Hsu | 425/466 |
| 4,208,178 | 6/1980 | Przytulla | 425/467 |
| 4,279,857 | 7/1981 | Feuerherm | 264/541 |
| 4,297,092 | 10/1981 | Goron | 425/532 |
| 4,302,170 | 11/1981 | Goron | 425/532 |
| 4,382,766 | 5/1983 | Feuerherm | 425/464 |
| 5,030,077 | 7/1991 | Orimoto et al. | 425/130 |
| 5,116,215 | 5/1992 | Hsu | 425/532 |

*Primary Examiner*—Tim Heitbrink
*Attorney, Agent, or Firm*—Stephen H. Friskney

[57] ABSTRACT

An accumulator head is convertible to alternate capacity ranges by providing a construction that has a segmented barrel with a matching ram in the purging system. More specifically, the accumulator barrel is divided into upper and lower segments so that the accumulator chamber is bounded by the lower barrel segment. The inner diameter of the lower barrel segment matches the outer diameter of the ram, and the length of the lower barrel segment corresponds roughly to the range of movement of the ram. With this accumulator construction, it is possible to change the working volume of the internal accumulator chamber by simply changing two parts, i.e., the lower barrel segment (inner diameter) and the ram (outer diameter). In addition, the two piece accumulator barrel design facilitates a more economical construction since the lower segment (where most of the wear occurs) can be made of a wear resistant grade of steel, while the upper segment can be manufactured from a lower cost, more easily machined material.

2 Claims, 4 Drawing Sheets

ACCUMULATOR HEAD HAVING A SEGMENTED BARREL

BACKGROUND OF THE INVENTION

1. Field of the Invention

The present invention relates generally to extrusion blow molding machines and, more particularly, to the configuration of the barrel and ram of an accumulator head in an extrusion blow molding machine.

2. Description of the Related Art

Containers and other hollow articles are frequently formed by blow molding. The blow molding process involves providing a tube of heated and softened plastics material (parison) about which a two-piece mold is closed. Air or another gas is introduced under pressure into the parison to expand it against the walls of the mold, forming the desired hollow article. Such blow molding machines can be of various types, the most common of which are extrusion-blow molding machines and injection-blow molding machines.

In extrusion-blow molding machines, plastics material is heated and softened in an extruder and is conveyed into a die head from which a tubular parison is extruded. The parison can either be continuous, whereby a plurality of molds are sequentially enclosed about successive, axially spaced portions of the parison, or individual parisons can be intermittently extruded and subsequently blown. In the latter instance, the die head includes a chamber, usually called an accumulator, in which the extruded material is accumulated to provide a predetermined volume of material. The accumulated volume of material is then ejected through an annular die at the outlet of the accumulator to form a parison having the desired length, diameter, and wall thickness distribution.

Typically, an accumulator has a purging system to accomplish the function of ejecting the accumulated material by forcing it through the die at the outlet, and a programming system to control the die opening at the outlet for varying the wall thickness of the extruded parison and to close the die while plastic for the next parison is being fed into the accumulator. The speed at which material is ejected by the purging system is often synchronized with the size of the die opening as controlled by the programming system. This synchronization enables the wall thickness to vary in a controlled manner over the length of the parison.

During production operation, an accumulator head is designed to receive from the extruder a quantity of plastic melt equal to the size of the parison to be formed. To facilitate use in range of applications, the charge of plastic melt can be varied as desired, up to a maximum, which corresponds to the full volume of the accumulator chamber. Typically, accumulator heads are identified by their maximum capacity, for example, a "60 lb." head. In order to provide a design that will perform satisfactorily, the operating systems of the accumulator head must be sized to operate at the maximum capacity. From a practical standpoint, the accumulator operates most effectively over a relatively limited range of parison sizes, with the maximum capacity being the upper limit of that range. More specifically, there is better processing control if the dimensions of the accumulator chamber and the length of the ram stroke approximate the desired parison in diameter and length.

These factors governing accumulator design dictate that the manufacturer have several different accumulator constructions available to meet the market requirements for different size containers. As the market expands to new applications requiring larger and larger parisons, new accumulator heads must be designed to provide the desired capacity. The prior art has not provided an accumulator construction that can be easily modified to alter the capacity of the accumulator chamber.

Furthermore, in order for an accumulator to be economical to manufacture, it is desirable for accumulators of different capacities to have as many common parts as practical. However, the advantage of lower parts inventory must be balanced against compromises in the overall design that affect performance. Accumulator barrel constructions of the prior art require that the entire barrel be constructed for a high grade of steel to resist the wear of repeated operation of the purging system.

SUMMARY OF THE INVENTION

Accordingly, it is an object of the present invention to provide an accumulator construction that is convertible to alternate capacity ranges. It is a further object of the present invention to provide a barrel construction that allows use of lower cost materials in the manufacture of the accumulator.

In the preferred embodiment, the present invention accomplishes these objectives by providing an accumulator construction having a segmented barrel with a matching ram in the purging system. More specifically, the accumulator barrel is divided into upper and lower segments. The barrel is divided so that the accumulator chamber is bounded by the lower barrel segment. By design, the ram of the purging system moves within the lower barrel segment to eject the accumulated melt to form the parison. Accordingly, the inner diameter of the lower barrel segment matches the outer diameter of the ram, and the length of the lower barrel segment corresponds roughly to the range of movement of the ram.

In an accumulator having this construction, it is possible to change the working volume of the internal accumulator chamber by simply changing two parts, i.e., the lower barrel segment (inner diameter) and the ram (outer diameter). A third part, the taper seal ring, is also changed to adapt the new barrel diameter to the parison tooling. With the capability of altering the capacity of the accumulator in this manner, the chamber can be altered to provide a greater range of parison sizes for use in forming the desired products.

In addition, the accumulator construction of the present invention dictates that the primary conditions causing surface wear will occur only in the lower barrel segment. Accordingly, the lower segment is made of a wear resistant grade of steel, while the upper segment can be manufactured from a lower cost, more easily machined material. This provides a clear advantage over prior art accumulators where the entire barrel has to be manufactured from the wear resistant (higher cost, difficult to machine) material.

In summary, the structure of the accumulator defined by the present invention facilitates conversion from one capacity range to another, and allows lower cost materials to be used in manufacture of the barrel. Furthermore, the conversion is done with changing only three components in the entire accumulator.

DESCRIPTION OF THE PREFERRED EMBODIMENT

Figure 1:
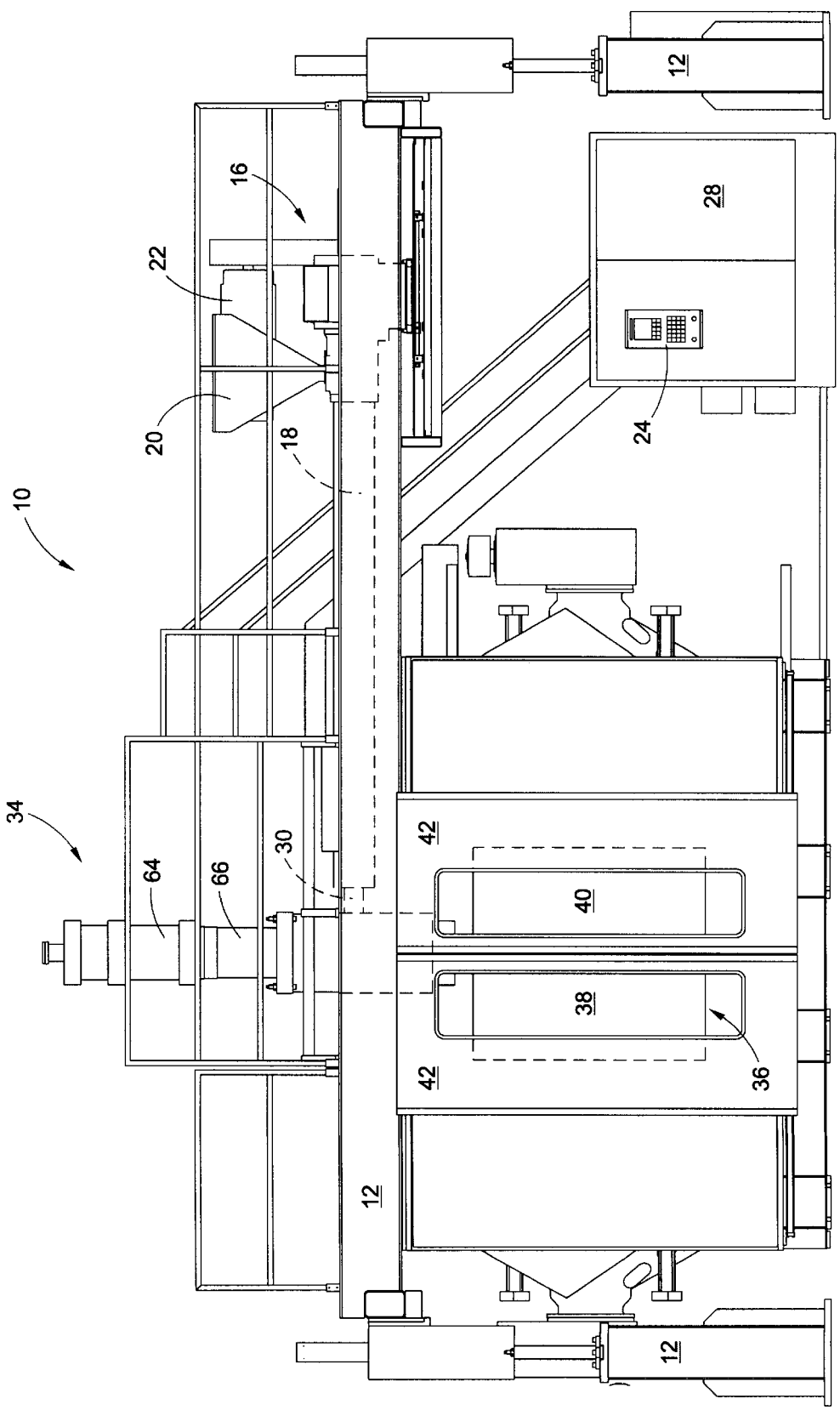
FIG. 1 is a side elevational view of an extrusion blow molding machine having an accumulator head with a segmented barrel in accordance with the present invention.

The present invention involves apparatus associated with extrusion blow molding. In order to better understand the invention, it is useful to describe it in the context of a typical blow molding machine including an accumulator. Referring now to the drawings, and particularly to FIG. 1, there is shown an extrusion-blow molding machine 10 including a supporting frame 12. Positioned on the upper section of the frame 12 is an extruder 16 having a tubular barrel 18 that contains a rotatable plasticizing screw (not shown). The plasticizing screw works in conjunction with heating of the barrel 18 to convey and soften solid plastics material, thereby providing a viscous, flowable melt for subsequent use in forming a parison, as is generally known in the art.

The solid plastic material is supplied to the extruder 16 through a feed hopper 20 that leads to an opening in the extruder barrel 18. The plasticizing screw is preferably rotated by an electric motor 22 suitably supported by the structure. Additionally, an electrical system cabinet 28 is provided for housing the electrical and electronic components used for controlling the various elements of the blow molding machine 10 as set by an operator control panel 24.

The outlet 30 of the horizontally disposed extruder barrel 18 is connected by a material inlet coupling 32 to a substantially vertically disposed accumulator head 34, in order to transfer the plasticized material from extruder 16. Positioned below accumulator head 34 is a mold 36 configured in a manner known to those skilled in the art, typically in the form of two horizontally opposed mold portions 38,40. Each of the mold portions 38,40 is machined to define a mold cavity (not shown) that conforms in shape with the desired external surface conformation of the finished blow molded article when the two mold portions 38,40 are brought together. A cover or gate 42 is provided in front of mold 36. The upper portion of the accumulator 34 includes two hydraulic cylinders that have axially aligned mechanisms to provide an upper, programming actuator 64, and a lower, purging actuator 66.

The accumulator head 34 provides a means of quickly forming a parison that requires a large quantity of plastic melt, the construction is shown in greater detail in FIGS. 2 through 7. As shown in the drawings, an accumulator outer barrel 44 of tubular form is oriented with its axis extending substantially vertically. The barrel 44 is divided into an upper barrel segment 72 and a lower barrel segment 74. To provide a more economical construction, the lower barrel segment 74 is preferably made of a wear resistant grade of steel, while the upper barrel segment 72 is manufactured from a lower cost, more easily machined grade of steel. A transverse material inlet aperture 46 is provided through the wall of upper barrel segment 72 to provide a melt flow path between the interior of accumulator barrel 44 and outlet 30 of extruder barrel 18, via extruder adapter 32.

Accumulator lower barrel segment 74 includes a material outlet which terminates in the form of an annular die outlet 48 through which the tubular parison (not shown) is extruded. Die outlet 48 is defined by a die outer ring 50 that is secured by means of a clamping ring 104 to the lowermost end of accumulator lower barrel segment 74, and by an inner mandrel 52 that has an outer cylindrical surface spaced from the inner surface of die outer ring 50 to define a die outlet of substantially annular form to provide a tubular parison. The mandrel 52 is actually part of a parison adjustment assembly (as is familiar to those skilled in the art) that is used to control the size of the die opening 48.

A programming actuator 64 (FIG. 1) is used to move mandrel 52 up or down, thereby varying the size of the annular opening at parison die outlet 48, including closing the outlet 48 while a shot of material is building in the accumulator chamber. In the embodiment shown, the die ring 50 and mandrel 52 illustrate diverging tooling; i.e., downward movement enlarges the die opening to increase parison wall thickness and upward movement constricts the opening to decrease wall thickness, eventually closing the outlet so that the accumulator can be recharged. Converging tooling (not shown), as is often used with small parisons, would close by downward movement and open when the mandrel moves upward.

Purging actuator 66 (FIG. 1) is positioned below the programming actuator 64 and serves to impart vertical movement to the ram (plunger) 80 of accumulator head 34. The purging actuator 66 operates in a vertical (downward) direction that moves the ram 80 and causes material contained in the chamber 82 of accumulator head 34 to be ejected in the form of a parison.

Concerning the inner workings of the accumulator head 34, as shown in FIGS. 2–5, accumulator barrel 44 has an inner cylindrical surface 84 that receives the ram 80 and a tubular containment sleeve 86 within the ram 80. Positioned within the containment sleeve 86 is a spiral sleeve 88, also of tubular configuration. Spiral sleeve 88 includes a cylindrical inner surface 90 that surrounds the outer surface of lower adjustment rod 51. The outer surface of the spiral sleeve 88 includes a pair of helically disposed channels 94 for conveying plasticized material from the extruder 16 to the holding chamber 82 in the accumulator head 34.

Figure 3:
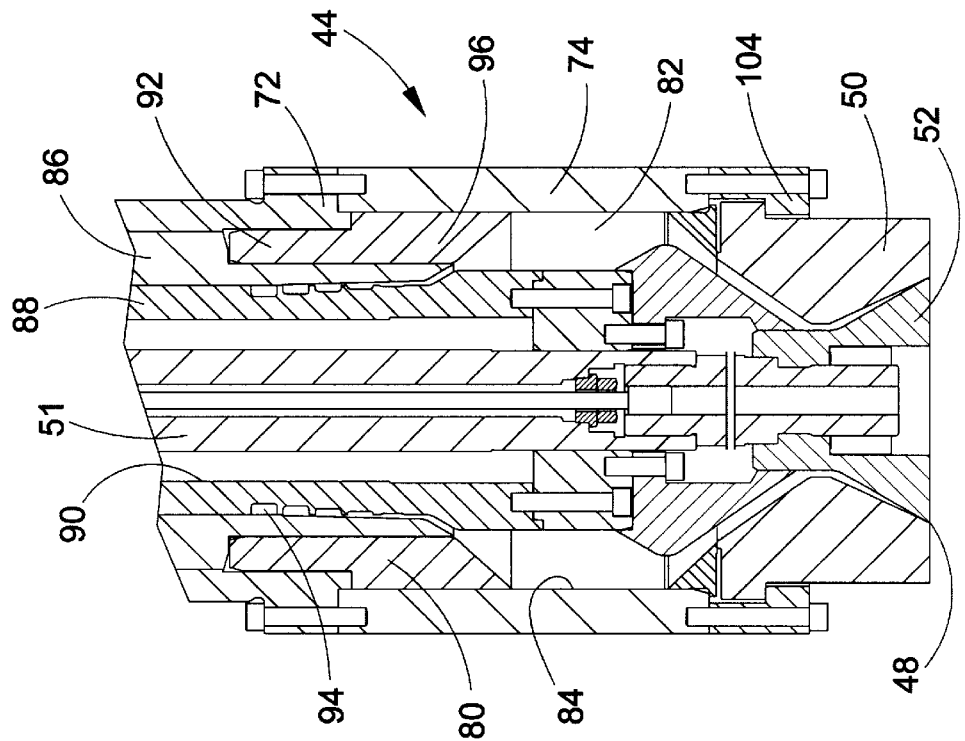
FIG. 3 is a view similar to FIG. 2, showing the lower portion of the accumulator with the lower barrel segment, ram and seal ring changed from that shown in FIG. 2 to provide a larger capacity for the accumulator chamber.
Figure 5:
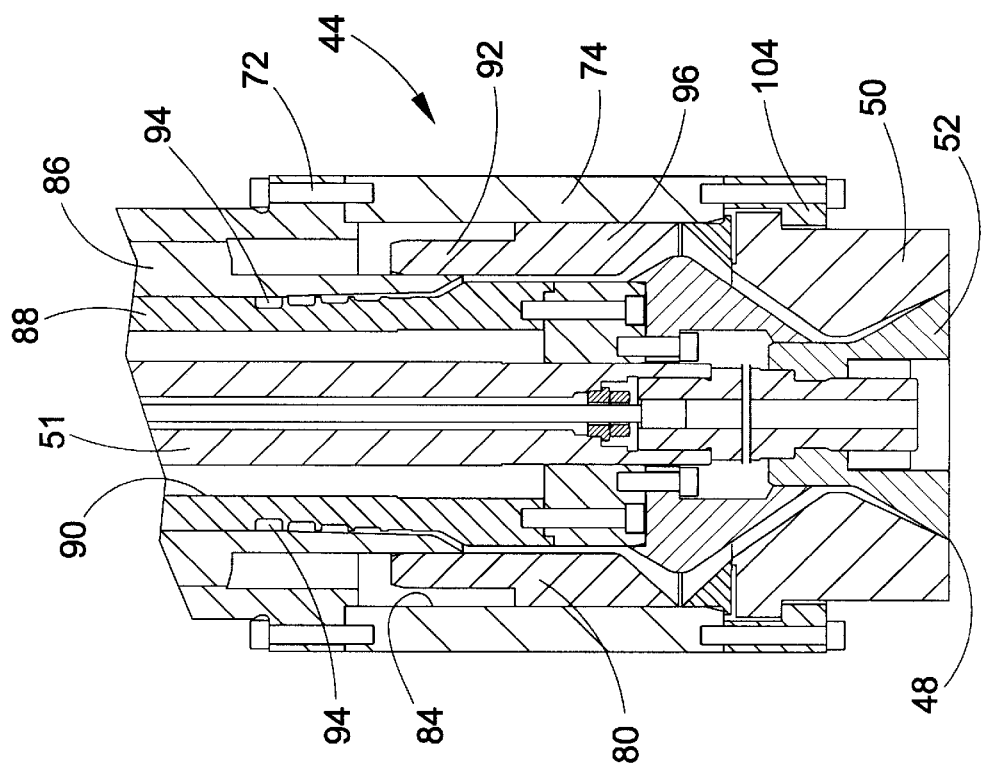
FIG. 5 is a view similar to FIG. 4, showing the lower portion of the accumulator with the lower barrel segment, ram and seal ring changed from that shown in FIG. 4 to provide a larger capacity for the accumulator chamber.

The outer diameter of the ram 80 is sized to match the inner diameter of the barrel 44. In particular, as best seen in FIGS. 3 and 5, the ram 80 has an upper portion 92 the outer diameter of which matches the inner diameter of the upper barrel segment 72, and a lower portion 96 the outer diameter of which matches the inner diameter of the lower barrel segment 74.

Figure 2:
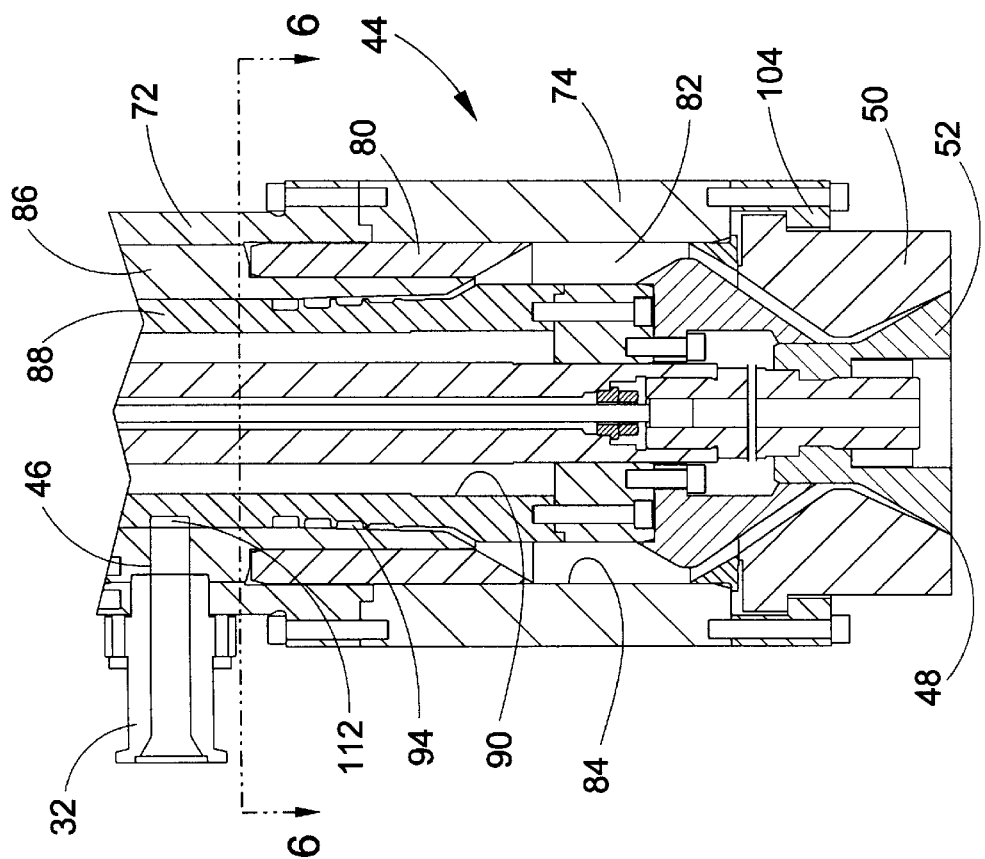
FIG. 2 is a fragmentary, side elevational view, partially in section, showing the lower portion of the accumulator, including the structure of the barrel and accumulator head in accordance with the present invention, with the ram of the accumulator shown in a retracted position.
Figure 4:
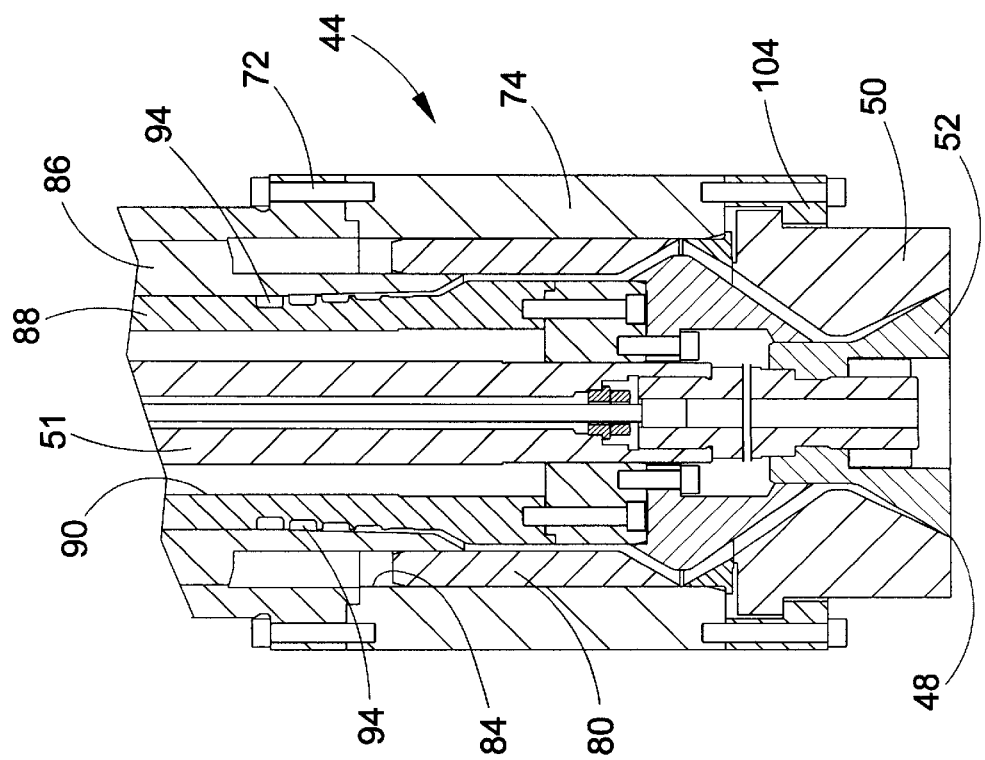
FIG. 4 is a view similar to FIG. 2, showing the lower portion of the accumulator with the ram in its extended position after plasticized material has been ejected from the accumulator through the parison die outlet.
Figure 6:
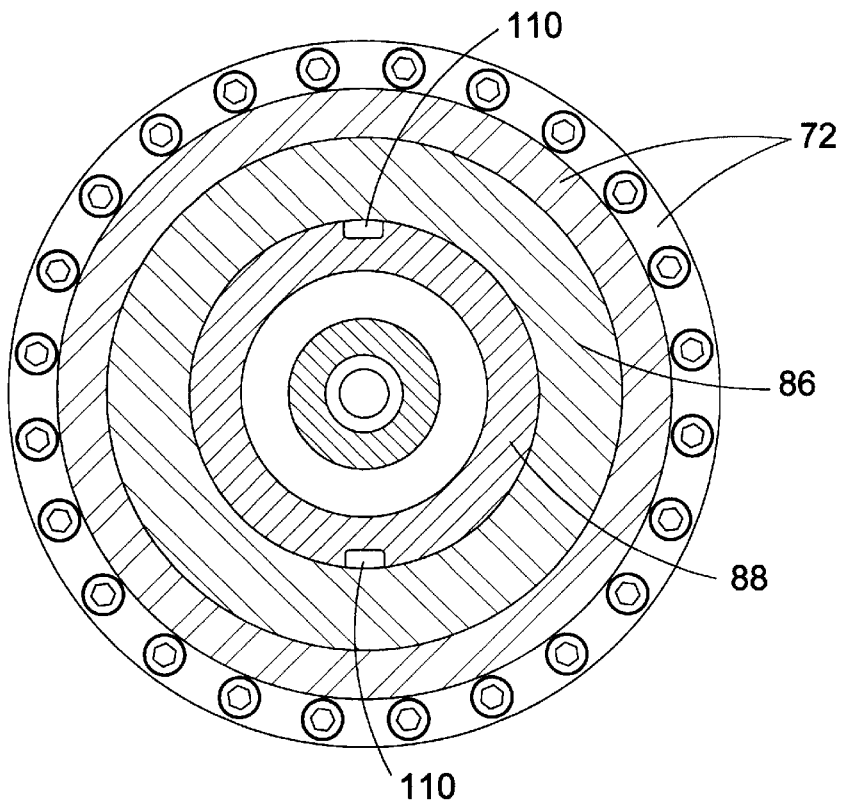
FIG. 6 is a partial section view of the accumulator head of the present invention taken along the line 6—6 of FIG. 2.
Figure 7:
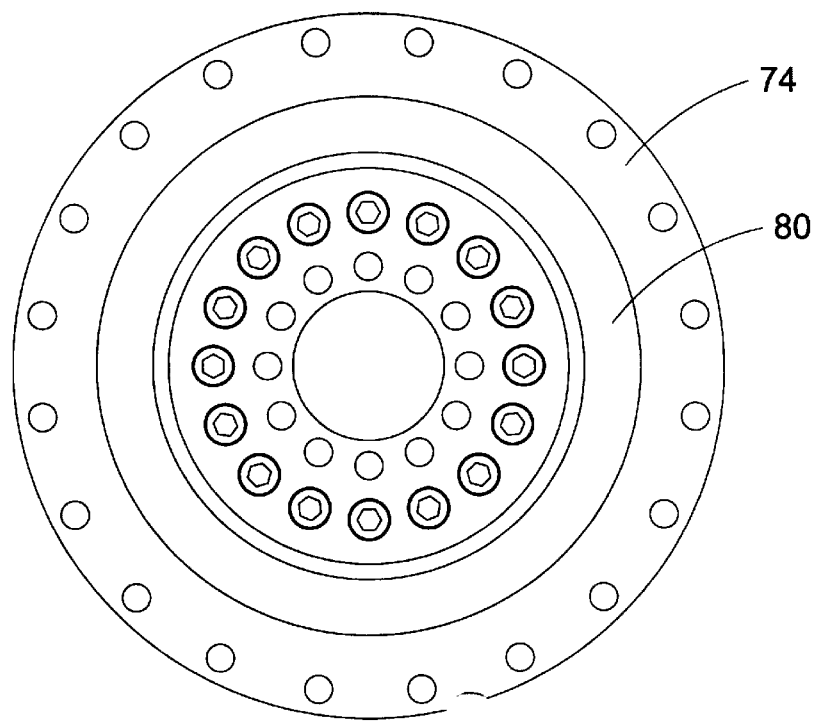
FIG. 7 is a bottom view showing the accumulator head of the present invention with the parison forming tooling removed for clarity.

For the nominal capacity of accumulator chamber 82, the outer diameter of the ram 80 and the inner diameter of the barrel 44 are relatively constant over their length (as shown in FIGS. 2 and 4). To provide a larger capacity for accumulator chamber 82, the outer diameter of the ram 80 is different for the upper and lower portions 92, 96 (see FIGS. 3 and 5), so that the upper portion 92 of ram 80 matches the inner diameter of the upper barrel segment 72 and the lower portion 96 of ram 80 matches the inner diameter of the lower barrel segment 74, as shown.

When the extrusion blow molding machine is in operation, plasticized material issues from extruder 16 through extruder outlet 30 and into accumulator inlet aperture 46. As shown in FIG. 2, a peripheral flow slot 112 in spiral sleeve 88 is oriented so that it faces inlet aperture 46 of the containment sleeve 86, allowing material to enter accumulator 34 through flow slot 112.

The containment sleeve 86 and spiral sleeve 88 remain stationary as material is supplied from the extruder 16. After the plasticized material flows through accumulator inlet aperture 46 and into flow slot 112 it divides and flows into respective side channels 110 (FIG. 6) in spiral sleeve 88 which lead to the helical channels 94 in spiral sleeve 88. The channels 94 are oriented such that their respective beginning points are diametrically opposed on the in spiral sleeve 88. This configuration causes the plasticized material to flow along respective channels 94 toward lower end of spiral sleeve 88.

Since mandrel 52 is initially in an upward, retracted position to close the parison die outlet 48, the plasticized material entering the accumulator head collects within the annular chamber 82 defined by the lowermost end of the lower segment 74 of accumulator outer barrel 44 and the lower adjustment rod 51 where it connects to mandrel 52. As the material continues to flow into this annular chamber, the ram 80 is gradually pushed upwardly by the continuously accumulating material. The upward movement of the ram 80 continues until the it reaches a predetermined vertical position that corresponds to the desired volume of accumulated material. If the control 24 is set to accumulate the maximum volume of material, the ram 80 will have moved to the uppermost position within accumulator outer barrel 44, as shown by FIGS. 2 and 3.

When the desired volume of material has been transferred into the annular chamber 82 near the end of accumulator outer barrel 44, programming actuator 64 is operated to position mandrel 52, thereby providing the desired size of the opening at parison die outlet 48 consistent with the wall thickness of the parison to be extruded. Purging actuator 66 is then operated to drive the ram 80 in a downward direction, back to the position shown in FIGS. 4 and 5 in order to eject the plasticized material from accumulator barrel 44 in the form of a tubular parison.

When the parison has been fully ejected, the mold portions 38,40 close around it. The programming actuator 64 is activated to retract mandrel 52, closing die opening 48 so that the accumulator head 34 can begin building the next shot of material. About the same time, blowing air is introduced into the parison via a passage that extends from the top of the accumulator 34 down though the mandrel 52 to an exit opening near the lowermost end of the accumulator 34. The blowing air expands the parison to fill the mold cavity defined by the mold portions 38,40.

If desired, the wall thickness of the parison can be varied as the parison is being ejected. For that purpose, a suitable variable programming system, the structure and operation of which is familiar to those skilled in the art, can be employed to control the vertical movement of the mandrel 52 in conjunction with the ejection of the parison from the die outlet 48. More specifically, the speed at which material is ejected by the purging actuator 66 is synchronized with the size of the die opening as controlled by the programming actuator 64. The mandrel 52 moves up or down as necessary to obtain a desired parison wall thickness distribution over the length of the parison, while the purging actuator 66 is operating to control the speed at which the parison is ejected.

Although particular embodiments of the present invention have been illustrated and described, it will be apparent to those skilled in the art that various changes and modifications can be made without departing from the spirit of the present invention. For example, it is contemplated that various configurations of the ram 80 and accumulator barrel segments 72, 74 would function to allow variation of the volume of chamber 82. In addition, while shown in conjunction with a specific accumulator head construction, the concept of a divided barrel can be used with other heads of differing construction, as are generally known in the art. It is, therefore, intended to encompass within the appended claims all such changes and modifications that fall within the scope of the present invention.

What is claimed is:

1. An accumulator head for an extrusion-blow molding machine comprising:

a tubular barrel assembled from at least two separate components including a generally cylindrical upper barrel segment and a generally cylindrical lower barrel segment, wherein the lower barrel segment has a substantially uniform inner diameter that is greater than the inner diameter of the upper barrel segment at the juncture of the two segments, an annular ram slidably received within the upper and lower barrel segments, wherein the ram has upper and lower portions, such that the upper portion of the ram has an outer diameter that is sized to match the inner diameter of the upper barrel segment and the lower portion of the ram has a larger outer diameter that is sized to match the inner diameter of the lower barrel segment, and an annular melt flow collection chamber bounded, in part, by the inner diameter of the lower barrel segment, wherein plastic melt is received in the collection chamber and subsequently ejected by the ram through a die to form a tubular parison.

2. The accumulator head in accordance with claim 1 wherein the length of the lower barrel segment corresponds roughly to the length of the lower portion of the ram plus a predetermined range of movement of the ram within the tubular barrel.

* * * * *